US006607328B1

(12) United States Patent
Treiber et al.

(10) Patent No.: US 6,607,328 B1
(45) Date of Patent: Aug. 19, 2003

(54) FASTENER ASSEMBLY FOR PIVOTAL ENGAGEMENT OF ADJACENT COMPONENTS

(76) Inventors: Mark R. Treiber, 4405 Baker St., Philadelphia, PA (US) 19127-0619; Terry W. Louth, 5960 Michele Dr., Narvon, PA (US) 17555

( * ) Notice: Subject to any disclaimer, the term of this patent is extended or adjusted under 35 U.S.C. 154(b) by 0 days.

(21) Appl. No.: 09/285,815

(22) Filed: Apr. 2, 1999

(51) Int. Cl.[7] .............................................. F16B 21/00
(52) U.S. Cl. ................................... 403/408.1; 403/282
(58) Field of Search .......................... 411/504, 500, 411/501, 502, 503, 506, 43, 70, 34, 551; 403/408.1, 280, 282, 119, 154; 16/337, 338, 339; 29/432.1, 509

(56) References Cited

U.S. PATENT DOCUMENTS

| | | | |
|---|---|---|---|
| 2,915,152 A | * 12/1959 | Graham ............... 403/408.1 X |
| 2,921,819 A | 1/1960 | Rifkin | |
| 3,650,173 A | 3/1972 | Mathe | |
| 3,687,496 A | * 8/1972 | Hindin ..................... 29/509 X |
| 3,962,843 A | * 6/1976 | King, Jr. ................. 403/282 X |
| 4,074,608 A | 2/1978 | Siebol | |
| 4,170,920 A | 10/1979 | Siebol | |
| 4,351,224 A | * 9/1982 | Curtis ........................... 89/37 |
| 4,579,473 A | 4/1986 | Brugger | |
| 4,639,175 A | 1/1987 | Wollar | |
| 4,760,495 A | 7/1988 | Till | |
| 4,784,550 A | 11/1988 | Wollar | |
| 4,843,703 A | * 7/1989 | Nolte et al. .............. 403/282 X |
| 4,878,795 A | * 11/1989 | Woodrow et al. ........... 411/501 |
| 4,896,990 A | 1/1990 | Nakamura et al. | |
| 4,900,205 A | * 2/1990 | Sadri ........................ 411/43 X |
| 5,005,906 A | * 4/1991 | Suzuki et al. ................ 297/362 |
| 5,106,249 A | 4/1992 | Janotik | |
| 5,252,014 A | * 10/1993 | Andrews ............. 403/408.1 X |
| 5,320,465 A | 6/1994 | Smith | |
| 5,395,160 A | * 3/1995 | Krebs et al. ............. 297/411.2 |
| 5,553,962 A | * 9/1996 | Eustache ..................... 403/154 |
| 5,620,287 A | 4/1997 | Pratt | |
| 5,685,663 A | 11/1997 | Sadri | |
| 5,759,001 A | 6/1998 | Smith | |
| 5,779,422 A | * 7/1998 | Petignat ....................... 411/551 |
| 5,846,039 A | 12/1998 | Kirchen et al. | |
| 5,940,936 A | * 8/1999 | Lu .............................. 411/501 |
| 5,980,147 A | * 11/1999 | Journee ....................... 403/119 |
| 6,017,085 A | * 1/2000 | LaCroix et al. ............. 297/173 |
| 6,074,126 A | * 6/2000 | Hunter et al. ........... 403/282 X |
| 6,123,482 A | * 9/2000 | Keller ......................... 403/384 |

* cited by examiner

Primary Examiner—Lynne H. Browne
Assistant Examiner—David E. Bochna

(57) ABSTRACT

A fastener assembly is adapted to engage components for rotation with respect to one another. The fastener assembly includes a support contacting one of the components and a fastener contacting the other one of the components. A body of the fastener extends through apertures defined in the components and in the support. An end portion of the body of the fastener is deformed radially outwardly into engagement with the support. The fastener engages the components and the support upon deformation with sufficient compression along a pivot axis to resist unintended rotation of the components with respect to one another and to permit intended rotation of the components.

27 Claims, 6 Drawing Sheets

FASTENER ASSEMBLY FOR PIVOTAL ENGAGEMENT OF ADJACENT COMPONENTS

BACKGROUND OF THE INVENTION

1. Field of the Invention

This invention relates to a fastener assembly adapted for pivotal engagement of adjacent components. More particularly, this invention relates to a fastener assembly adapted to engage adjacent components so that they can be pivoted with respect to one another about a pivot axis.

2. Related Art

Over the years, many fastener assemblies have been proposed, to provide rotational motion between two adjacent components. For example, threaded fasteners such as screws have been proposed to provide a pivot point or pivot axis for the rotational coupling of components.

Referring to FIG. 1 for the purpose of illustration, one version of a threaded fastener assembly is shown. Threaded fastener assembly 10 is used to couple adjacent components 12A and 12B for rotation about a pivot axis 11.

Fastener assembly 10 provides a threaded nut 14 that is press-fit into component 12A or otherwise attached to components 12A in a manner that prevents rotation of nut 14 with respect to component 12A. Fastener assembly 10 also includes a slotted, threaded screw 16 having a threaded body 18, with male threads, that extends through apertures (not shown) in adjacent components 12A and 12B for threaded engagement with the female threads in nut 14. The screw 16 is tightened with the use of a screwdriver in order to force components 12A and 12B into frictional contact with one another along their adjoining surfaces.

Fastener assembly 10 also includes a split or beveled lock washer 20 between the surface of adjacent component 12B and the head of screw 16. The washer 20 is intended to increase the frictional engagement between the male threads of body 18 of screw 16 and the female threads of nut 14, thereby resisting rotation between nut 14 and screw 16 that would cause the fastener assembly to loosen.

It has been discovered, however, that the use of threaded fastener assemblies to provide rotational motion between two adjacent components can have several disadvantages. First, such systems can be inconsistently assembled in production because the torque applied to the screw such as screw 16 can vary from one assembly to the next. Accordingly, the resistance to rotation as between components 12A and 12B can vary significantly from one assembly to the next. The quality of the "feel" of the resulting assemblies may therefore suffer.

Also, threaded fastener assemblies, especially when used for the rotational engagement of adjacent components, tend to loosen over time as the result of repeated use. Despite the intended operation of washer 20, the assembly can vary in tightness over time. Accordingly, a "floppy" feel can result, and the components will not remain in a desired position after being released. In other words, the loosened assembly will not be able to resist the effect of gravity on the components and a component might rotate as the result of the movement of the assembly. Also, a loosened assembly is likely to result in variations of the axis of the threaded fastener with respect to the components and the axis can become "skewed," thereby resulting in an unpredictably varying pivot axis.

Threaded fasteners can also be relatively expensive from the standpoint of labor and materials. For example, in the threaded fastener assembly 10 illustrated in FIG. 1, nut 14 must be press-fit into component 12A or otherwise connected in a preliminary operation. Washer 20 must then be assembled over the body 18 of screw 16. The screw 16 is then torqued into nut 14 to complete the assembly. The labor needed to complete assembly 10 is especially significant when many such assemblies are required for a particular product or product production line.

From the standpoint of materials, threaded fastener assembly 10 requires three components in addition to adjacent components 12A and 12B; namely, threaded fastener assembly 10 requires a nut 14, a screw 16, and a washer 20. Although each of these individual fastener components may not be expensive, the cumulative expense may be significant when many such assemblies are required. Also, the expense of inventory can also become significant.

Accordingly, it is an object of this invention to provide a fastener assembly that overcomes the disadvantages associated with the prior art. It is a further object to provide a fastener assembly that can be assembled consistently to provide a quality "feel" to the end user. It is another object to provide a fastener assembly that will not loosen significantly over time with repeated use. It is yet another object to provide a fastener assembly with reduced labor and component expense.

SUMMARY OF THE INVENTION

A fastener assembly is provided that is adapted to engage adjacent components for rotation with respect to one another about an axis. According to an exemplary embodiment of the invention, the fastener assembly includes a component defining, an aperture extending therethrough along a pivot axis as well as an adjacent component also defining an aperture extending therethrough along the pivot axis. The fastener assembly also includes a support contacting the component, wherein the support defines an aperture extending therethrough along the pivot axis in substantially concentric arrangement with the apertures of the component and the adjacent component.

The fastener assembly also includes a fastener contacting the adjacent component, and the fastener has a body extending along the pivot axis and through the apertures defined in the component, the adjacent component, and the support. An end portion of the body extends beyond the support, and the body of the fastener has a cross section sized to permit insertion through the aperture defined in the support. The end portion of the body of the fastener is deformed radially outwardly into engagement with the support upon the insertion to a cross section sized to prevent removal of the end portion through the aperture defined in the support. The fastener engages the component, the adjacent component, and the support upon the deformation with sufficient compression along the pivot axis to resist unintended rotation of the component and the adjacent component with respect to one another about the pivot axis and to permit intended rotation of the component and the adjacent component.

DETAILED DESCRIPTION OF THE PREFERRED EMBODIMENTS

Figure 1:
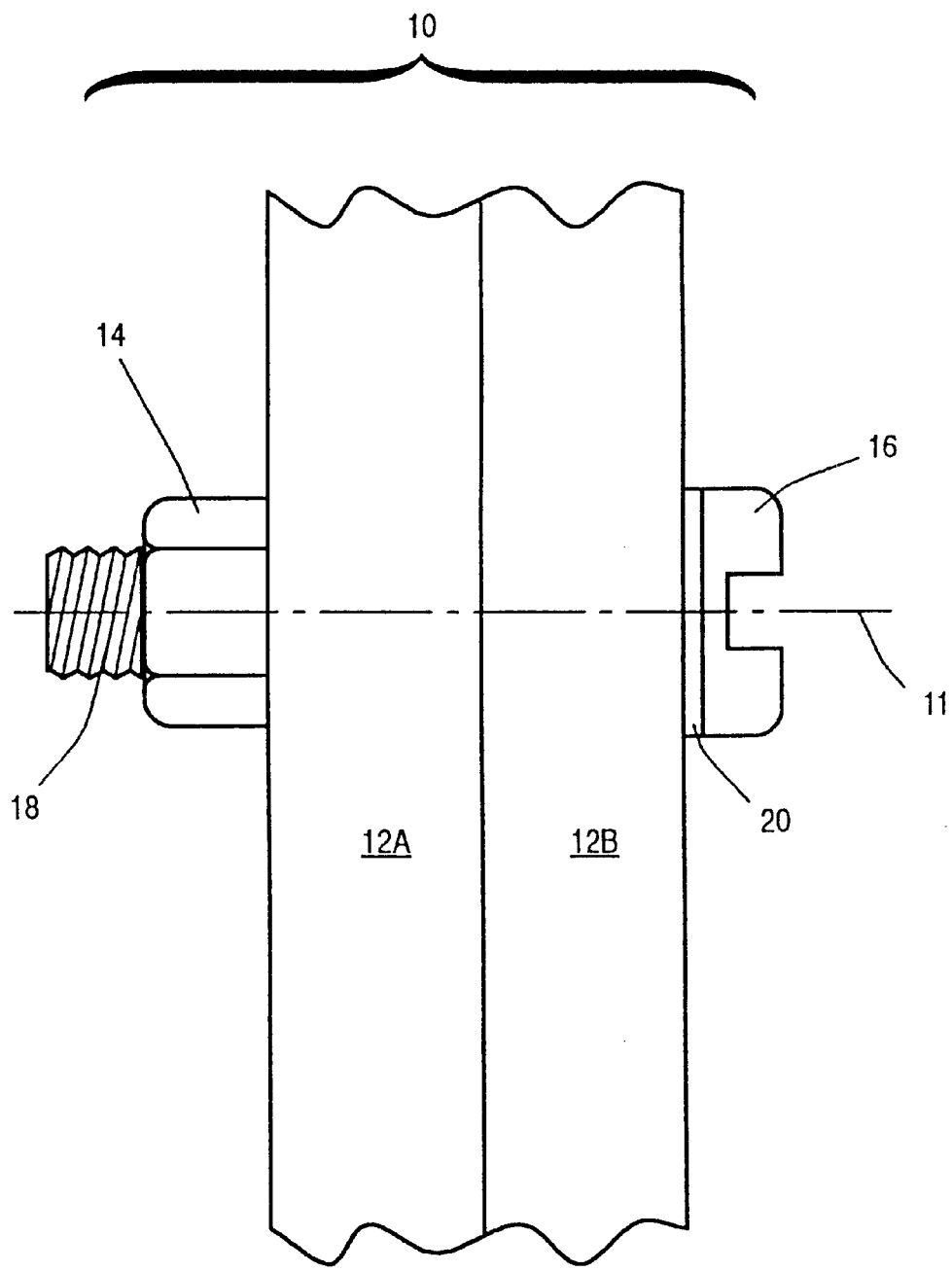
FIG. 1 is a front view of a threaded fastener assembly.

The following description is provided to illustrate preferred embodiments of the invention. This description of the embodiments selected for illustration in the drawings is not intended to limit the scope of the invention, which is defined separately in the appended claims. Also, it will be appreciated that the drawings are not to scale or proportion, and it is contemplated that many variations can be made to the particular components as well as the sizes and shapes and positioning of the components while still accomplishing the objects of this invention.

According to one preferred embodiment of this invention, a fastener assembly is provided in order to engage adjacent components for rotation with respect to one another. The fastener assembly includes a "component." In one application of this invention, the "component" can be a lever or a bracket to which the lever is to be engaged. The component defines an aperture extending through it along a pivot axis.

The fastener assembly also includes an "adjacent component." The adjacent component also defines an aperture extending through it along the pivot axis. If the "component" referred to above is a lever, for example, then the "adjacent component" can be a bracket to which the lever is to be connected. If on the other hand the "component" referred to above is a bracket, for example, then the "adjacent component" can be a lever to which the bracket is to be connected.

For purposes of illustrating one of many possible applications for the fastener assembly according to this invention, the "component" mentioned above is referred to as a lever and the "adjacent component" mentioned above is referred to as a bracket to which the lever is rotationally mounted in a manner according to this invention. Nevertheless, it will be appreciated that the fastener assembly can be used for the rotational engagement of a wide variety of components, wherever rotational engagement is beneficial.

According to a preferred embodiment, at least portions of the lever component and the adjacent bracket component are in contact with one another. Also, at least portions of the lever and the bracket are oriented in substantially parallel arrangement.

The fastener assembly also includes a shoulder washer contacting the lever. The shoulder washer defines an aperture extending through it along the pivot axis in substantially concentric arrangement with the apertures of the lever and the bracket. The shoulder washer includes a flange, extending radially outwardly with respect to the pivot axis, positioned for contact with a surface of the lever. The shoulder washer also includes a body extending in a direction along the pivot axis at least partially through the aperture defined in the lever.

Also included in the fastener assembly is a rivet contacting the bracket. The rivet includes a head, extending radially outwardly with respect to the pivot axis, positioned for contact with a surface of the bracket. The rivet further includes a body extending in a direction along the pivot axis and through the apertures defined in the lever, the bracket, and the shoulder washer. An end portion of the body extends beyond the shoulder washer, and the body of the rivet and the apertures defined in the lever and the bracket together define an annular space sized to accommodate the body of the shoulder washer.

The body of the rivet has a diameter sized to permit insertion through the aperture defined in the shoulder washer. The end portion of the body of the rivet is deformed radially outwardly into engagement with the shoulder washer upon such insertion to a diameter sized to prevent removal of the end portion through the aperture defined in the shoulder washer.

The rivet engages the lever, the bracket, and the shoulder washer upon the deformation with sufficient compression along the pivot axis to resist unintended rotation of the lever and the bracket with respect to one another about the pivot axis. The rivet also engages the other components of the fastener assembly so as to permit intended rotation of the lever with respect to the bracket.

Figure 2:
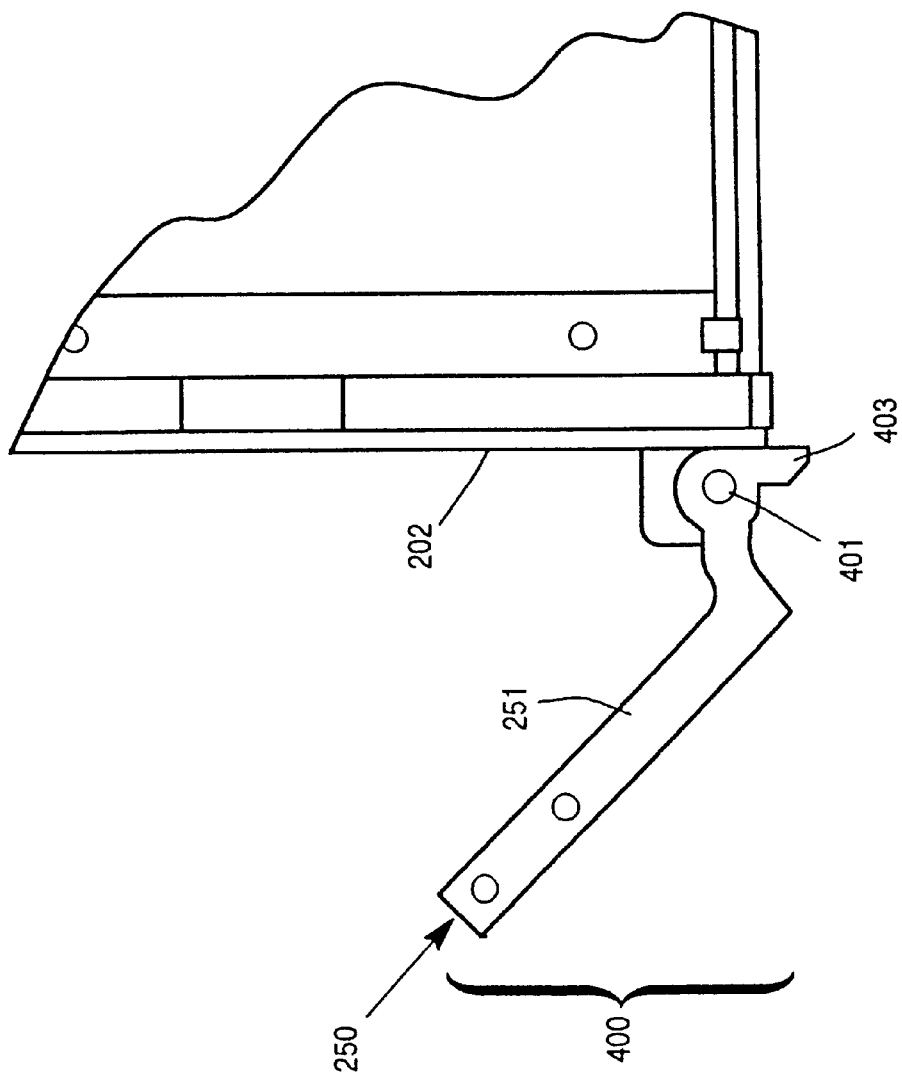
FIG. 2 is a right view of an environment in which a fastener assembly according to this invention can be used.

An exemplary embodiment of a fastener assembly according to this invention will now be described with reference to FIGS. 2-5. Referring first to FIG. 2, a fastener assembly according to this invention can be used for rotational engagement of a lever to the chassis of a computer system, for example, although many other applications are contemplated as well. As illustrated in FIG. 2, a fastener assembly 400 includes a lever 250 that is provided for pivotable movement with respect to a chassis 202. Specifically, lever 250 is connected for pivotal movement about a pivot 401. Lever 250 includes a grasping portion 251 and an engagement member 403. The engagement member 403 is positioned and shaped to bear against a surface of another component when lever 250 is rotated. The engagement member 403 of lever 250 can act as a cam-like surface, if desired.

Figure 3A:
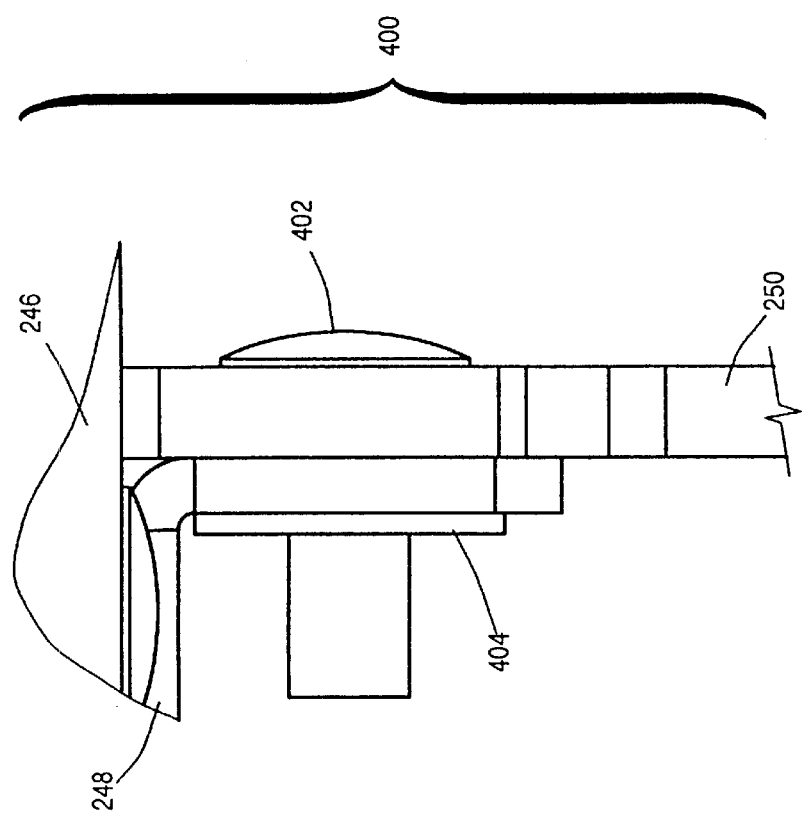
FIG. 3A is a top view of an embodiment of a fastener assembly according to this invention.
Figure 3B:
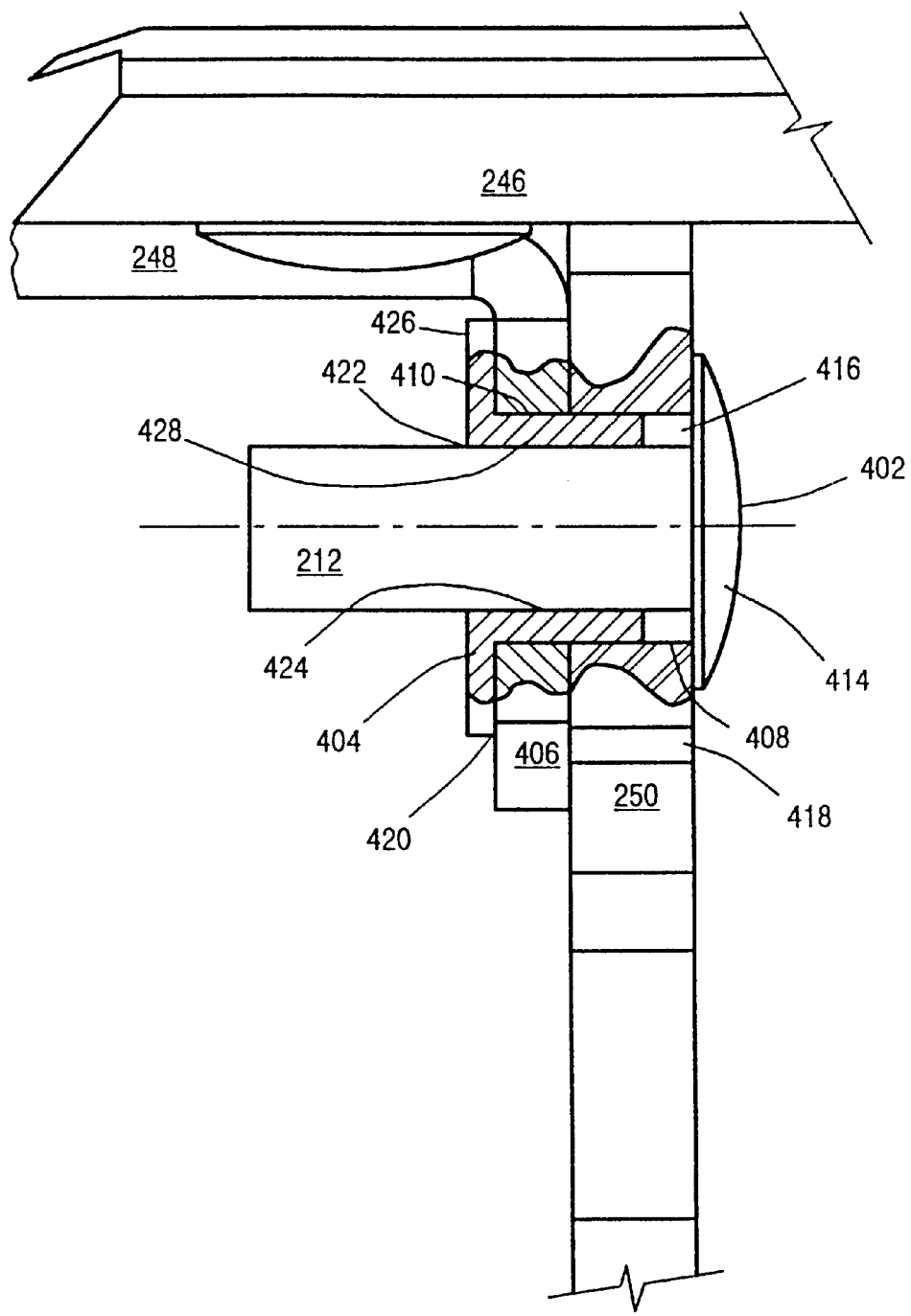
FIG. 3B is a cross-sectional top view of the fastener assembly illustrated in FIG. 3A.

Referring to the view provided in FIG. 3A as well as the cross-sectional view provided in FIG. 3B, fastener assembly 400 includes a fastener such as a rivet 402 and a support such as a shoulder washer 404 in order to provide compressive engagement of a component such as lever 250 to an adjacent component such as bracket 248. As illustrated in FIG. 3B, a flange portion 406 of bracket 248 is provided with a bracket aperture 410 and lever 250 is provided with a lever aperture 408. Rivet 402 has a rivet body 412 and a rivet flange or head 414. Body 412 of rivet 402 extends through apertures 408 and 410, thereby forming an annular space 416 between an outer surface of body 412 and the inner surface of apertures 408 and 410. Rivet flange 414 bears against outer surface 418 of lever 250.

Shoulder washer 404 bears against an outer surface 420 of flange portion 406 of bracket 248. Shoulder washer 404 is provided with a support surface 422 that defines a support aperture 424 through which rivet body 412 extends. Shoulder washer 404 includes a flange 426 for contact with the outer surface 420 of flange portion 406. A support body 428 of shoulder washer 404 extends at least partially through apertures 408 and 410 in the annular space 416 provided between the outer surface of rivet body 412 and the inner walls of the apertures.

Figure 4B:
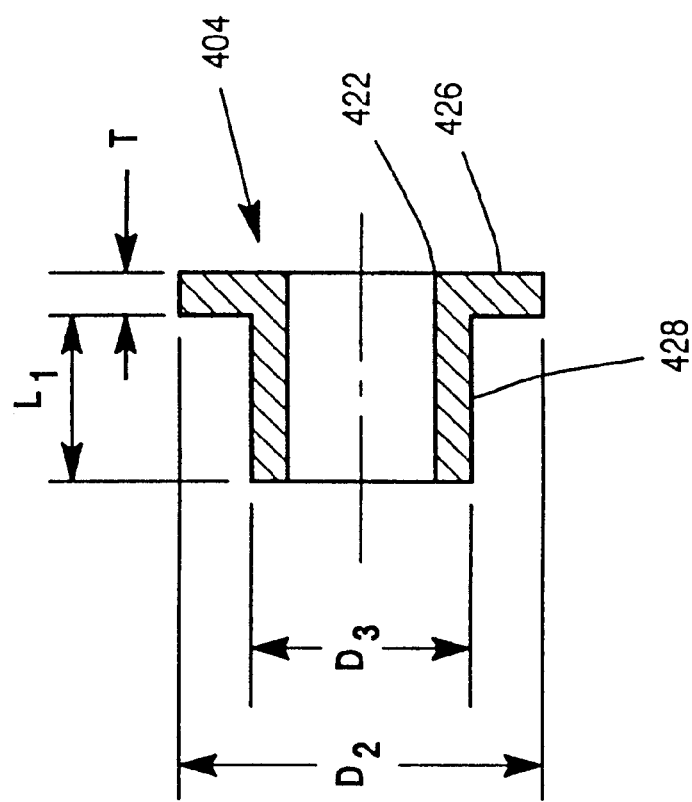
FIGS. 4A and 4B illustrate an embodiment of a support adapted for use in the fastener assembly illustrated in FIGS. 3A and 3B.
Figure 4A:
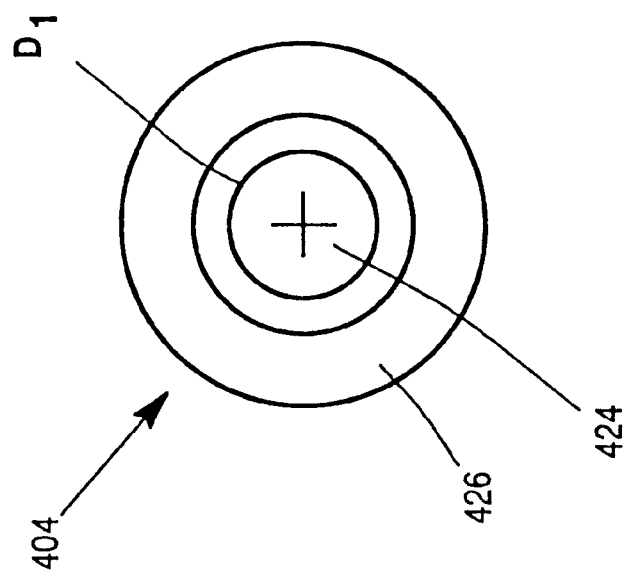

Further details of shoulder washer 404 are illustrated in FIGS. 4A and 4B. The flange 426 of shoulder washer 404 has a thickness "T" and an outer diameter "$D_2$" that is greater than the diameter of aperture 410 (FIG. 3B). Body 428 of shoulder washer 404 has an outer diameter "$D_3$" that is less than that of aperture 410 for insertion therein. Body 428 has a length "$L_1$" that is less than the combined thicknesses of lever 250 and flange portion 406. The inner diameter "$D_1$" of aperture 424 is greater than that of body portion 412 of rivet 402.

Shoulder washer 404 is preferably formed from a polymer such as nylon, although other metallic or polymeric materials are contemplated as well. Shoulder washer 404, if formed from a polymer, can be molded or machined from rod or tubing. The use of a polymer is preferred because it will deform slightly as rivet 402 is deformed, thereby providing additional surface area contact between the support and the rivet. Also, the use of a polymer is believed to improve the "feel" of the assembly as it is rotated.

Figure 5:
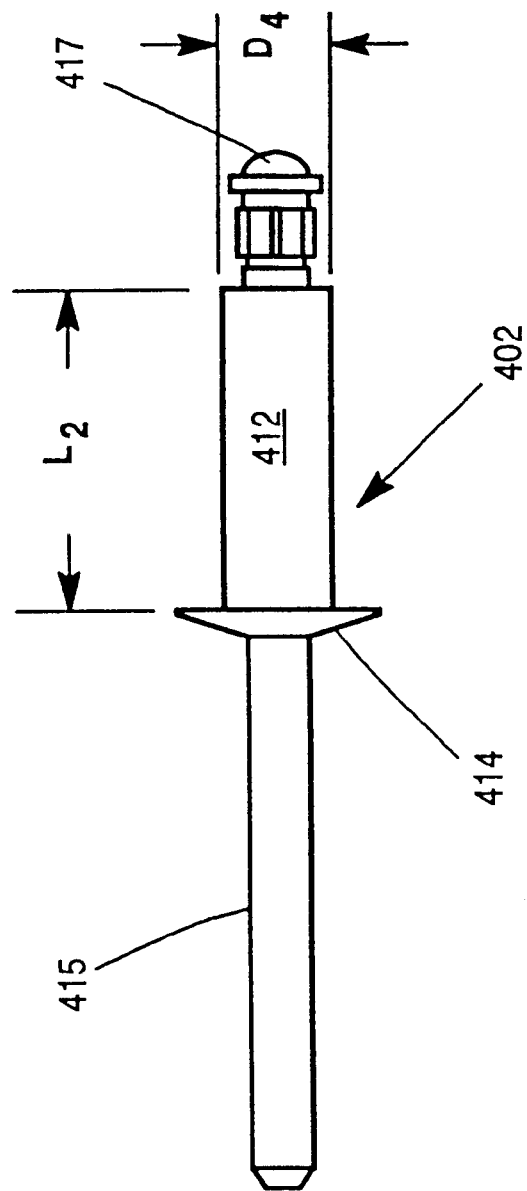
FIG. 5 is a side view of an embodiment of a fastener adapted for use in the fastener assembly illustrated in FIGS. 3A and 3B.

Referring now to FIG. 5, preferred aspects of rivet 402 are illustrated. Rivet 402 includes a body, a head, and a stem that can be grasped by a rivet gun in order to deform an end portion of the body radially outwardly. Generally, blind rivets typically include a mandrel and a rivet sleeve. The sleeve is generally tubular and is provided with a flange at one end. The mandrel comprises a head and a pulling stem. The pulling mandrel extends through the flanged end of the sleeve. In use the rivet sleeve passes through a hole in a workpiece. The rivet is held in place by a force on the flange and the pulling stem of the mandrel is pulled to set the rivet. As a result the sleeve of the rivet deforms on the blind side to secure the rivet in position. Further pulling results in the pulling stem breaking, usually at a predetermined breakneck position and at a predetermined force.

Rivets such as "pop" rivet 402 are designed to "pop" at a predetermined pulling force and, therefore, they can provide substantially consistent pressure as between two joined components. Accordingly, rivets can provide consistent engagement forces in difference assemblies whereas threaded fasteners vary in their engagement forces depending on the amount of torque applied.

Rivet 402 has a sleeve including a body 412 and a head or flange 414. Rivet 402 also includes a mandrel having a stem 415 that can be grasped by a rivet gun in order to deform an end portion of the body portion radially outwardly. More specifically, body 412 has a length "$L_2$" greater than that of the combined thicknesses of lever 250 and flange portion 406. As stem 415 is grasped and pulled to the left in FIG. 5, a head or ball 417 is drawn into the interior of body 412 and deforms the end portion radially outwardly. It is this deformation of the end portion of rivet 402 that causes engagement between the two rotationally mounted components. In other words, diameter "$D_4$" of body 412 is initially equal to or less than the diameter $D_1$ of the shoulder washer aperture 424. Upon deformation, the diameter $D_4$ at the end portion of body 412 is greater than diameter $D_1$ of aperture 424, thereby bringing about bearing contact with shoulder washer surface 422. The compressive force, in conjunction with the use of shoulder washer 404, provides sufficient engagement as between the adjacent components so that mutual rotation of the components will not occur unless a force is applied. At the same time, the compressive force is not so great as to prevent manual rotation of one of the components with respect to the other.

It has been discovered that the positioning of at least a portion of a support (such as shoulder washer 404) between the surface of the rivet's body and the inner surface of a component's aperture helps to provide an improved fastener assembly. It is believed that the deformation of the rivet's end portion into direct contact with the inner surface of the component's aperture results in undesirable binding between the rivet and the component, thereby inhibiting smooth rotation of the components with respect to one another. Referring to FIG. 3B for example, tubular body portion 428 of shoulder washer 404 prevents direct contact between rivet body 412 and aperture 410 upon deformation of the end portion of body 412 radially outwardly.

Also, tubular body portion 428 helps to promote uniform radial contact as between the components upon deformation of the rivet. Deformation of rivet 402 places body 412 in bearing contact with an internal surface of shoulder washer aperture 424, and an exterior surface of body portion 428 bears in turn against aperture 410. Because a cylindrical rivet body 412 may not deform uniformly to a circular cross-sectional shape (and may instead be oval, for example), the provision of a support between the rivet and the aperture 410 is believed to more evenly distribute the radial forces exerted by the rivet. Although not required, the flange 426 of shoulder washer 404 tends to more evenly distribute the axial forces exerted by the rivet upon deformation. A polymeric support is believed to be especially advantageous because it will deform to accommodate any nonuniformity in the cross-sectional shape of the rivet body upon deformation yet conform to the cross-sectional shape of the aperture through which it extends.

Rivets such as rivet 402 are available from a variety of sources. Cherry Commercial Products, Townsend Division of Textron Inc., of Santa Ana, Calif. provides self-plugging, protruding head blind rivets under the product number SSPQ-XXX, depending on the size required. Such rivets can be formed from polymeric or metallic materials. Plated steel rivets are preferred.

The use of a pop rivet as a component of the fastener assembly according to this invention has been discovered to be especially beneficial, and pop rivets have been discovered to confer several significant advantages when uniquely applied according to this invention for the rotational engagement of adjacent components. For example, because pop rivets "pop" into engagement at a predetermined pulling force, they exert a predictable and uniform compression between the adjoined components in a direction along the pivot axis. This provides uniformity as to the "feel" (i.e., assembly tightness and resistance to rotation) and operation of mass-produced assemblies. Also, rivets will resist any significant loosening over time with repeated use. Rivets are also inexpensive and easy to install, thereby reducing material costs and assembly time.

Although this invention has been described with respect to particular embodiments for the purpose of illustration, it will be appreciated that this invention is not limited to those embodiments and that a wide variety of modifications and variations can be made without departing from the spirit of this invention. For example, if a shoulder washer is used, the flange of the washer can be positioned under the rivet's head as opposed to being positioned against the opposite surface of the other component. Alternatively, a tubular support (without any flange) can be positioned to extend between the rivet and the rotationally engaged components to prevent contact between the rivet's body and the component's aperture upon deformation of the rivet into engagement. Accordingly, the detailed description of this invention is not intended to limit the scope of this invention; instead, the scope of the invention is separately defined in the claims that follow.

What is claimed:

1. A fastener assembly adapted to engage components for rotation with respect to one another, said fastener assembly comprising:

adjacent components each defining an aperture extending therethrough along a pivot axis;

a polymeric support positioned at least partially within the aperture of at least one of said adjacent components, said support defining an aperture extending therethrough along said pivot axis in substantially concentric management with said apertures of said adjacent components, said support comprising a flange extending radially outwardly with respect to said pivot axis and contacting one of said adjacent components; and a fastener having a body extending along said pivot axis and through said apertures defined in said adjacent components and said support, an end portion of said body extending beyond said support, said body of said fastener having a cross section sized to permit insertion through said aperture defined in said support, and said end portion of said body of said fastener being deformed radially outwardly into engagement with said support upon said insertion to a cross section sized to prevent removal of said end portion through said aperture defined in said support;

said fastener engaging said adjacent components and,said support upon said deformation with sufficient compression in a direction along said pivot axis to resist unintended rotation of said adjacent components with respect to one another about said pivot axis and to permit intended rotation of said adjacent components with respect to one another.

2. The fastener assembly recited in claim 1, at least one of said adjacent components comprising a plate or a sheet.

3. The fastener assembly recited in claim 1, one of said adjacent components comprising a lever.

4. The fastener assembly recited in claim 1, at least portions of said adjacent components being oriented in substantially parallel arrangement.

5. The fastener assembly recited in claim 1, at least portions of said adjacent components being in frictional contact with one another.

6. The fastener assembly recited in claim 1, at least one of said adjacent components being metallic.

7. The fastener assembly recited in claim 1, said support comprising a body extending at least partially through said aperture defined in one of said adjacent components in an annular space defined between said aperture defined in said adjacent component and said body of said fastener.

8. The fastener assembly recited in claim 1, said support being selected from the group consisting of a shoulder washer and a tube.

9. The fastener assembly recited in claim 1, said fastener comprising flange extending radially outwardly with respect to said pivot axis positioned or contact with one of said adjacent components.

10. The fastener assembly recited in claim 1, said body of said fastener and said aperture defined in said support having circular cross sections, wherein a diameter of said body is equal to or smaller than a diameter of said aperture.

11. The fastener assembly recited in claim 12, said end portion of said body of said fastener being deformed radially outwardly with respect to said pivot axis to a diameter larger than said diameter of said aperture.

12. The fastener assembly recited in claim 1, said fastener being a rivet having a body deformed sufficiently upon said insertion to engage said adjacent components and said support.

13. The fastener assembly recited in claim 1, said fastener being metallic.

14. The fastener assembly recited in claim 1, said compression being sufficient upon deformation to permit said intended rotation yet prevent rotation from a predetermined orientation between said adjacent components upon said rotation and release of said adjacent components.

15. A fastener assembly adapted to engage components for rotation with respect to one another, said fastener assembly comprising:

a component defining an aperture extending therethrough along a pivot axis;

an adjacent component also defining an aperture extending therethrough along said pivot axis, at least portions of said component and said adjacent component being in frictional contact with one another;

a support contacting said component, said support defining an aperture extending therethrough along said pivot axis in substantially concentric arrangement with said apertures of said component and said adjacent component, said support comprising a body extending at least partially through said aperture defined in said component and an integral flange extending radially outwardly from said body with respect to said pivot axis, said flange contacting said component; and a fastener comprising a body extending along said pivot axis and through said apertures defined in said component, said adjacent component, all said support, an end portion of said body extending beyond said support, and said body of said fastener and said aperture defined in said component together defining an annular space sized to accommodate said body of said support;

said body of said fastener having a cross section sized to permit insertion through said aperture defined in said support, and said end portion of said body of said fastener being deformed radially outwardly into engagement with said support upon said insertion to a cross section sized to prevent removal of said end portion through said aperture defined in said support;

said fastener engaging said component, said adjacent component, and said support upon said deformation with sufficient compression in a direction along said pivot axis to resist unintended rotation of said component and said adjacent component with respect to one another about said pivot axis and to permit intended rotation of said component with respect to said adjacent component.

16. The fastener assembly recited in claim 15, at least one of said component and said adjacent component comprising a plate or a sheet.

17. The fastener assembly recited in claim 15, one of said component and said adjacent component comprising a lever.

18. The fastener assembly recited in claim 15, at least portions of said component and said adjacent component being oriented in substantially parallel arrangement.

19. The fastener assembly recited in claim 15, said support being polymeric.

20. The fastener assembly recited in claim 15, said body of said fastener and said aperture defined in said support having circular cross sections, wherein a diameter of said body is equal to or smaller than a diameter of said aperture.

21. The fastener assembly recited in claim 20, said end portion of said body of said fastener being deformed radially outwardly with respect to said pivot axis to a diameter larger than said diameter of said aperture.

22. A fastener assembly adapted to end case components for rotation with respect to one another, said fastener assembly comprising:

component defining an aperture extending therethrough along a pivot axis;

an adjacent component also defining an aperture extending therethrough along said pivot axis, at least portions of said component and said adjacent component being in frictional contact with one another, and at least portions of said component and said adjacent component being oriented in substantially parallel arrangement;

a shoulder washer contacting said component, said shoulder washer defining an aperture extending therethrough along said pivot axis in substantially concentric arrangement with said apertures of said component and said adjacent component, said shoulder washer comprising a flange extending radially outwardly with respect to said pivot axis and contacting said component, and said shoulder washer comprising a body extending in a direction along said pivot axis at least partially through said aperture defined in said component; and a rivet comprising a head extending radially outwardly with respect to said pivot axis and a body extending in a direction along said pivot axis and through said apertures defined in said component, said adjacent component, and said shoulder washer, an end portion of said body extending beyond said shoulder washer, and said body of said rivet and said aperture defined in said component together defining an annular space sized to accommodate said body of said shoulder washer;

said body of said rivet having a diameter sized to permit insertion through said aperture defined in said shoulder washer, and said end portion of said body of said rivet being deformed radially outwardly into engagement with said shoulder washer upon said insertion to a diameter sized to prevent removal of said end portion through said aperture defined in said shoulder washer;

said rivet engaging said component, said adjacent component, and said shoulder washer upon said deformation with sufficient compression in a direction along said pivot axis to resist unintended rotation of said component and said adjacent component with respect to one another about said pivot axis and to permit intended rotation of said component with respect to said adjacent component.

23. The fastener assembly recited in claim 22, at least one of said component and said adjacent component comprising a plate or a sheet.

24. The fastener assembly recited in claim 22, one of said component and said adjacent component comprising a lever and the other one of said component and said adjacent component comprising a bracket, said lever being engaged for rotation with respect to said bracket.

25. The fastener assembly recited in claim 22, said shoulder washer being polymeric.

26. A method for engaging components for rotation with respect to one another about a pivot axis, said method comprising the steps of:

(a) positioning the components in contact with one another such that an aperture extending through each of the components is oriented along the pivot axis;

(b) positioning a support at least partially within at least one of the adjacent components with the aperture of the support in substantially concentric arrangement with the apertures of the adjacent components and a flange of the support adjacent one of the components;

(c) inserting a body of a fastener through the apertures of the adjacent components and the support and extending an end portion of the body of the fastener beyond the support;

(d) deforming the end portion of the body of the fastener radially outwardly into engagement with the support; and (e) generating a compressive force between the flange of the support and the adjacent components in a direction along the pivot axis, thereby resisting rotational movement of the adjacent components with respect to one another and permitting intended rotation of the adjacent components with respect to one another.

27. A fastener assembly adapted to engage components for rotation with respect to one another, said fastener assembly comprising:

a component defining an aperture extending therethrough along a pivot axis;

an adjacent component also defining an aperture extending therethrough along said pivot axis;

a support positioned at least partially within the aperture of said component, said support defining an aperture extending therethrough along said pivot axis in substantially concentric arrangement with said aperture of said component, said support comprising a flange extending radially outwardly with respect to said pivot axis and contacting said component; and a fastener having a flange contacting said adjacent component and a body extending along said pivot axis and through said apertures defined in said component, said adjacent component, and said support, an end portion of said body extending beyond said support, said body of said fastener having a cross section sized to permit insertion through said aperture defined in said support, and said end portion of said body of said fastener being deformed radially outwardly into engagement with said support upon said insertion to a cross section sized to prevent removal of said end portion through said aperture defined in said support;

said fastener engaging said component, said adjacent component, and said support upon said deformation with sufficient compression in a direction along said pivot axis to resist unintended rotation of said component with respect to said adjacent component about said pivot axis and to permit intended rotation of said component with respect to said adjacent component.

* * * * *